June 14, 1949.  A. G. McNEILL  2,473,288
COMBINATION TABLE UTENSIL
Filed Jan. 12, 1946
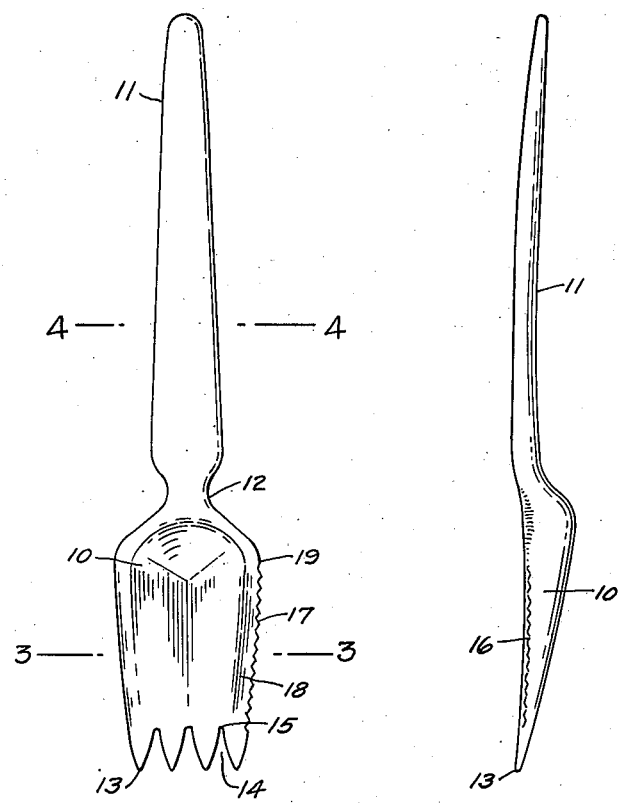
Fig. 1   Fig. 2
   
Fig. 3   Fig. 4
INVENTOR.
ALBERT G. McNEILL
BY
Joshua R. H. Potts
HIS ATTORNEY Patented June 14, 1949

2,473,288

UNITED STATES PATENT OFFICE 2,473,288

COMBINATION TABLE UTENSIL

Albert George McNeill, Philadelphia, Pa., assignor to Bachmann Bros., Inc., Philadelphia, Pa., a corporation of Pennsylvania Application January 12, 1946, Serial No. 640,774

4 Claims. (Cl. 30—147)

This invention relates to table utensils, and particularly a device embodying the elements of a spoon with the bowl thereof shaped to provide a flat spreading surface at one side, a knife edge at the other and prongs simulating a fork at the end.

The invention contemplates incorporating the elements of a spoon, fork, knife and spreader in one utensil to facilitate packing implements for picnicking and the like. Package lunches, particularly those including salads, are provided with the necessary utensils, and instead of supplying a knife, fork and spoon, it is contemplated to provide a single utensil embodying the elements of the three.

In preparing utensils for feeding large groups of people, such as in the Army, it is objectionable to set each plate with the usual group of utensils, whereas with the various utensils combined in one not only setting the plate but also cleaning is facilitated.

The purpose of this invention is, therefore, to facilitate packaging edibles for picnics and the like and also providing utensils for use in feeding groups by combining substantially all of the necessary utensils in one.

In providing spoons with sharp cutting edges, there is danger of cutting the lips and, therefore, this invention contemplates providing a raised protecting rounded edge portion just behind the edge of a spoon where the edge is sharp and adapted to be used as a knife.

It is difficult to spread cheese, butter and the like with a rounded surface and, therefore, the spoon of this invention is formed with a flat surface on the underside of the bowl, making it adapted for spreading and the like.

An object of the invention is to shape the bowl of a spoon wherein a portion of the undersurface thereof is flat so that it may be used as a spreader, an edge thereof is sharpened for use as a knife, and the said sharpened edge is protected by a raised portion forming a rounded edge portion to prevent cutting the lips.

Another object is to provide prongs at the tip of the bowl of a spoon whereby the spoon may also be used as a fork.

With these and other objects in view, the invention embodies a utensil having a bowl simulating a spoon with a handle extending at the back, with prongs formed in the tip, with a flat surface on a portion of the underside, and with a side sharpened to provide a cutting edge and provided with a protecting rounded edge portion for said cutting edge.

For a full and more complete understanding of the invention, reference may be had to the following description and accompanying drawings, wherein:

Figure 1 shows a plan view of the utensil.

Figure 2 shows a side elevation of the utensil.

Figure 3 is a cross section through the bowl of the utensil on line 3—3 of Figure 1.

Figure 4 is a cross section through the handle of the utensil on line 4—4 of Figure 1.

Referring now to the drawings wherein like reference characters denote corresponding parts, the utensil is formed with a bowl 10 and a handle 11, the handle being connected to the bowl with a relatively narrow section 12.

The utensil is formed with relatively sharp points or prongs 13 at the tip with openings 14 between, extending into the bowl to the points 15, thereby providing a fork at the tip. These points or tines may be of any shape and as many tines as may be desired may be provided.

One edge 16 of the bowl 10 is sharpened to form a knife and this may be formed with serrations 17 as shown to facilitate cutting. This edge is also formed with a raised portion or rounded edge portion 18 just behind the cutting edge to prevent the edge contacting the lips when the device is used as a spoon. The cutting edge extends from the tip to the point 19 adjacent the back of the bowl.

The bowl of the utensil is preferably V-shaped in cross section, as shown in Figure 3, whereby a flat surface 20 is provided that is adapted to be used as a spreader for butter, cheese and the like. This flat spreading surface may be formed on the underside of the spoon or bowl in any manner. The vertex of the V-shaped bowl is slightly rounded, and this shape is continued through the length of the handle as shown in the section in Figure 4. It will be understood that the handle may be of any shape or design.

The design and relative positions of the different elements will be readily understood from the foregoing description and illustration. In use the utensil may be used as a spoon in the usual manner and when it is desired to cut it may be turned so that the edge 16 may be used as a knife. The utensil may also be used as a spreader by turning the bowl so that the surface 20 will be at the lower side and by holding it in a substantially upright position it may also be used as a fork.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. A table utensil comprising a handle and a bowl, characterized in that the bowl is V shaped in cross section providing a flat spreading surface at one side.

2. A table utensil comprising a handle and a bowl, characterized in that the bowl is V shaped in cross section with a sharp cutting edge at one side and a flat spreading surface on the underside and at the opposite side.

3. A table utensil comprising a handle and a bowl, characterized in that the bowl is V shaped in cross section with a sharp cutting edge at one side and a flat spreading surface on the underside and at the opposite side, said bowl having a rounded edge portion in the upper side thereof, said rounded edge portion being arranged adjacent to and extending along the said cutting edge.

4. A table utensil comprising a handle and a bowl, characterized in that the bowl is V shaped in cross section and provided with a serrated cutting edge at one side, a flat spreading surface on the underside, tines at the end thereof simulating a fork, and a rounded edge portion formed on the upper side of said bowl and behind the said cutting edge.

ALBERT GEORGE McNEILL.

REFERENCES CITED

The following references are of record in the file of this patent:

UNITED STATES PATENTS

| Number | Name | Date |
|---|---|---|
| D. 93,956 | Wilson | Nov. 21, 1934 |
| 202,757 | Reese | Apr. 23, 1878 |
| 468,592 | Blackwell | Feb. 9, 1892 |